US012755289B2

(12) United States Patent
Osburn

(10) Patent No.: US 12,755,289 B2
(45) Date of Patent: Oct. 6, 2026

(54) DYNAMICALLY MAPPING PAYMENT CARD TOKENIZATION UTILIZING PREDICTED TRANSACTION CHARACTERISTICS

(71) Applicant: Marqeta, Inc., Oakland, CA (US)

(72) Inventor: Daniel Osburn, Miami, FL (US)

(73) Assignee: Marqeta, Inc., Oakland, CA (US)

( * ) Notice: Subject to any disclaimer, the term of this patent is extended or adjusted under 35 U.S.C. 154(b) by 81 days.

(21) Appl. No.: 18/150,518

(22) Filed: Jan. 5, 2023

(65) Prior Publication Data

US 2024/0232897 A1 Jul. 11, 2024

(51) Int. Cl.
*G06Q 20/40* (2012.01)
*G06Q 20/24* (2012.01)

(52) U.S. Cl.
CPC ........... *G06Q 20/405* (2013.01); *G06Q 20/24* (2013.01)

(58) Field of Classification Search
None
See application file for complete search history.

(56) References Cited

U.S. PATENT DOCUMENTS 8,490,869 B2 * 7/2013 Brown ................... G06Q 20/40 235/380
9,710,821 B2 * 7/2017 Heath ................ G06Q 30/0222
10,796,295 B2 * 10/2020 Subbarayan ....... G06Q 20/3223
10,963,871 B2 * 3/2021 Safak ................. G06Q 20/3223
11,157,943 B2 * 10/2021 Basu ...................... G06Q 20/22
11,354,644 B2 * 6/2022 Kumaraguruparan ....................... G06Q 20/405
11,587,078 B2 * 2/2023 Dutta ..................... G06Q 20/34
11,657,448 B2 * 5/2023 Grassadonia .......... G06Q 40/00 705/44
11,663,568 B1 * 5/2023 Anderson ............ G06Q 20/405 705/39
2019/0147515 A1 * 5/2019 Hurley ............... G06Q 20/3821 705/44
2023/0297995 A1 * 9/2023 Cline ................... G06Q 20/227 705/44
2024/0169336 A1 * 5/2024 Vudathu .............. G06Q 20/227

* cited by examiner

*Primary Examiner* — Christopher Bridges
(74) *Attorney, Agent, or Firm* — Keller Preece PLLC

(57) ABSTRACT

This disclosure describes methods, non-transitory computer readable storage media, and systems that dynamically map tokens according to predicted characteristics of the transaction. Specifically, the disclosed system accesses information associated with a payment account including characteristics of previous transactions associated with the payment account, which corresponds to a plurality of separate sub-accounts (e.g., a debit account and a credit account). The disclosed system determines predicted transaction characteristics for the next future transaction based on the information associated with the payment account. Furthermore, the disclosed system generates a request to a payment network to re-map a token associated with the payment account in connection with a selected sub-account according to the predicted transaction characteristics and a set of rules. The disclosed system also processes a subsequent transaction routed based on the re-mapped token in connection with the selected sub-account.

20 Claims, 8 Drawing Sheets

DYNAMICALLY MAPPING PAYMENT CARD TOKENIZATION UTILIZING PREDICTED TRANSACTION CHARACTERISTICS

BACKGROUND

Increases in computing technology and availability have led to an increase in use of card-based payment transactions and electronic payment transactions to complete purchase transactions. The prevalence of card/electronic payment transactions has led to many entities providing increased access to payment cards (e.g., credit cards or debit cards) for consumers to use with merchants and other recipient entities. Additionally, in connection with providing access to payment cards to use in card-based payment transactions and electronic payment transactions, some entities provide more options for funding card-based payment transactions or other parameters of accounts associated with the payment cards. Increasing the number of options available for payment card accounts, however, also increases the complexity of managing the payment card accounts or processing transactions involving the payment card accounts. Conventional systems that provide access to payment card accounts lack flexibility and efficiency in connection with increased complexity. For example, conventional systems are unable to process certain types of transactions based on hardware and software limitations of the conventional systems.

SUMMARY

This disclosure describes one or more embodiments of methods, non-transitory computer readable media, and systems that solves one or more of the foregoing problems (in addition to providing other benefits). In one or more embodiments, the disclosed systems dynamically map tokens according to predicted characteristics of the transaction. Specifically, the disclosed systems access information associated with a payment account including characteristics of previous transactions associated with the payment account, which corresponds to a plurality of separate sub-accounts (e.g., a debit account and a credit account). The disclosed systems determine predicted transaction characteristics for the next future transaction based on the information associated with the payment account. Furthermore, the disclosed systems generate a request to a payment network to re-map a token associated with the payment account in connection with a selected sub-account according to the predicted transaction characteristics and a set of rules. The disclosed systems also process a subsequent transaction routed based on the re-mapped token in connection with the selected sub-account. By routing a future transaction based on a re-mapping of a token for the payment account based on predicted transaction characteristics, the disclosed systems provide flexible and efficient processing of transactions.

BRIEF DESCRIPTION OF THE DRAWINGS

The detailed description refers to the drawings briefly described below.

DETAILED DESCRIPTION

Figure 1:
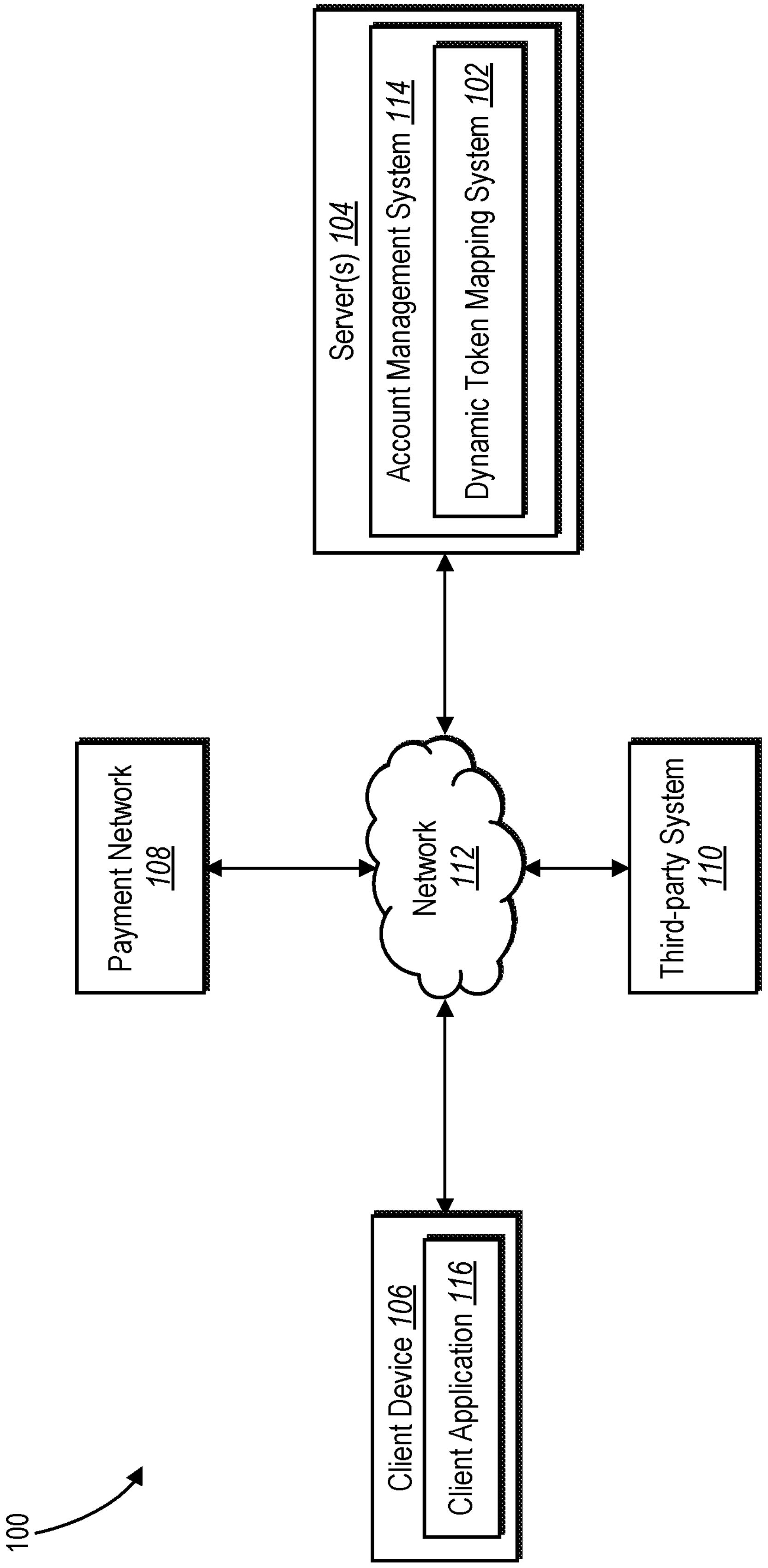
FIG. 1 illustrates a block diagram of a system environment in which a dynamic token mapping system is implemented in accordance with one or more implementations.

This disclosure describes one or more embodiments of a dynamic token mapping system that dynamically remaps tokens of a payment account for future transactions based on predicted transaction characteristics. In particular, the dynamic token mapping system utilizes payment account information and account details to generate predicted transaction characteristics for a future transaction (e.g., a subsequent transaction that has not yet occurred). Additionally, the dynamic token mapping system utilizes the predicted transaction characteristics to generate a token mapping request to send to a payment network in connection with a selected sub-account of the payment account. Furthermore, in response to a subsequent transaction for the payment account, the dynamic token mapping system processes the subsequent transaction routed via the payment network based on the token mapping in connection with the selected sub-account.

As mentioned, in one or more embodiments, the dynamic token mapping system determines payment account information and account details of a payment account. For example, the dynamic token mapping system accesses the payment account information including characteristics of a plurality of previous transactions associated with the payment account. To illustrate, the payment account information includes payment amounts associated with previous transactions of one or more sub-accounts of the payment account (e.g., from an account history) and/or additional account/transaction information associated with the payment account. Additionally, the dynamic token mapping system determines the account details including one or more available balances associated with one or more sub-accounts of the payment account.

According to one or more embodiments, the dynamic token mapping system determines predicted transaction characteristics for a future transaction. In particular, the dynamic token mapping system provides the information associated with a payment account to a third-party system (e.g., a card issuer or card program manager), which utilizes a prediction model to generate predicted transactions characteristics for a future payment transaction. In alternative embodiments, the dynamic token mapping system generates the predicted transaction characteristics for a future payment transaction (e.g., utilizing a machine-learning model).

In one or more embodiments, the dynamic token mapping system utilizes the predicted transaction characteristics to generate a token mapping request to provide to a payment network. Specifically, the dynamic token mapping system utilizes the predicted transaction characteristics to determine whether the future transaction is likely to correspond to a particular sub-account of the payment account. For example, the dynamic token mapping system selects a sub-account of the payment account according to a set of rules and the account details. The dynamic token mapping system sends the request to create the token mapping to the payment network to remap a token associated with the payment account to a particular processing pipeline associated with the selected sub-account.

Furthermore, in some embodiments, the dynamic token mapping system processes a subsequent transaction routed based on a token mapping for the payment account. The dynamic token mapping system processes the subsequent transaction via the payment network to route the subsequent transaction via a processing pipeline corresponding to the remapped token. For example, the dynamic token mapping system processes the subsequent transaction via the processing pipeline of the payment network according to the selected sub-account of the payment account and the remapped token corresponding to the selected sub-account.

As mentioned, conventional systems limit token mapping functions for the creation of new accounts and expired/compromised accounts. Specifically, conventional systems include controls that restrict certain mapping operations from occurring for security purposes to prevent bad actors from gaining access to or changing access to accounts. While limiting certain types of server requests to specific circumstances improves security, such restrictions also limit the flexibility and efficiency of payment transaction processing systems. Indeed, the conventional systems are limited to handling transactions via predefined processing pipelines.

The disclosed dynamic token mapping system provides a number of benefits over conventional systems. For example, the dynamic token mapping system improves the flexibility of computing systems that manage and process payment transactions. In contrast to existing systems that limit token mapping functionality for the creation of new accounts, expired account numbers, or compromised account numbers, the dynamic token mapping system provides dynamic tokenization to process different transactions according to predicted transaction characteristics in connection with transactions with increased complexity. Specifically, the dynamic token mapping system determines predicted characteristics of a future transaction to tokenize a payment account number for dynamically selecting a processing pipeline. More specifically, by predicting the transaction characteristics of the next subsequent transaction, the dynamic token mapping system can tokenize the payment account number for use in a processing pipeline that is most likely to correspond to the next transaction. The dynamic token mapping system is thus able to generate and/or remap tokens on a transaction-by-transaction basis for processing different types of transactions in different ways.

Additionally, the disclosed dynamic token mapping system provides improved efficiency of computing systems that process transactions. In contrast to existing systems with limited token mapping functionality—and consequently rigid processing pipeline utilization—the dynamic token mapping system utilizes dynamic tokenization to optimize a transaction interchange by selecting a processing pipeline ahead of time. In particular, the dynamic token mapping system determines predicted transaction characteristics for a subsequent future transaction to determine the most likely processing pipeline for the next transaction. Accordingly, by intelligently selecting a particular processing pipeline and generating a token mapping in advance of (e.g., asynchronously with) a future transaction according to predicted transaction characteristics, the dynamic token mapping system provides improved processing efficiency for transactions involving payment accounts with separate sub-accounts, which can further improve processing speed associated with certain transactions. Furthermore, by remapping the token for a payment account in advance of a future transaction, the dynamic token mapping system more efficiently processes the future transaction during the real-time processing of the future transaction by performing the token mapping ahead of time. In some embodiments, utilizing and training a machine-learning model to predict the transaction characteristics of a future transaction provides improved accuracy of determining whether a transaction that is yet to occur should be processed via a specific processing pipeline.

Furthermore, in connection with improving the accuracy and flexibility of computing systems involved in processing transactions, the dynamic token mapping system can leverage existing hardware and software of payment network servers/devices to provide dynamic tokenization for a payment account. In particular, the dynamic token mapping system can leverage existing application programming interface protocols of the payment network to cause the payment network to remap a particular payment account to a different processing pipeline (e.g., to swap between processing pipelines for separate sub-accounts). The dynamic token mapping system thus provides additional functionality for the servers of the payment network without requiring the payment network to create add additional protocols or hardware/software.

Turning now to the figures, FIG. 1 includes an embodiment of a system environment 100 in which a dynamic token mapping system 102 operates. In particular, the system environment 100 includes server(s) 104, a client device 106, payment network 108, and a third-party system 110 in communication via a network 112. FIG. 1 illustrates that the dynamic token mapping system 102 is part of an account management system 114. Moreover, in one or more embodiments, the client device 106 includes a client application 116.

As shown in FIG. 1, the server(s) 104 include or host the account management system 114. The server(s) 104 communicate with one or more other components in the system environment 100 to manage accounts and account programs (e.g., card programs) for one or more users (e.g., account program managers). For example, the server(s) 104 communicates with a client device to provide account management for users based on data provided/generated by the payment network 108 in connection with payment transactions for one or more payment accounts and/or account programs. As used herein, the term "payment account" refers to an account for engaging in payment transactions to transfer money from or to another account. In one or more embodiments, the account management system 114 manages preferences and settings for payment accounts. Additionally, the account management system 114 manages processing of card-based transactions or electronic payment transactions corresponding to payment accounts, such as by communicating with one or more other systems (e.g., the payment network 108 and/or the third-party system 110). In one or more embodiments, a payment account includes a plurality of sub-accounts corresponding to one or more types of payment accounts. To illustrate, a payment account can include one or more debit sub-accounts, and/or one or more credit sub-accounts.

According to one or more embodiments, a payment account includes a card, such as a physical or digital object corresponding to a card program account for engaging in electronic card transactions. For instance, a card includes a physical debit/credit card and/or a digital debit/credit card (e.g., in a digital wallet) tied to a payment account (e.g., a card program account) via a card number that allows a user to initiate a payment transaction to transfer funds from the payment account to a recipient account (e.g., a merchant account) via the payment network 108. In one or more embodiments, the payment network 108 include one or more payment gateway systems, one or more card networks (e.g., MASTERCARD), and/or one or more card issuer systems (e.g., bank issuers) to process electronic card transactions in connection with the account management system 114. Furthermore, the payment network 108 include one or more servers to generate, store, and transmit data associated with initiating and processing payment transactions via the account management system 114.

As used herein, the term "account program" refers to software and data that determines when and how one or more payment accounts can be used to engage in payment transactions. For example, an account program includes a plurality of parameter configurations that define attributes of an account associated with the account program including, but not limited to, pricing (e.g., annual percentage rate), fees, usage locations, rewards, discounts, or other attributes. Accordingly, different account programs that have different parameter configurations provide different usage, benefits, etc., to users of cards/accounts corresponding to the different account programs. In some embodiments, an account program includes one or more payment accounts associated with one or more users and provides settings for utilizing payment accounts to initiate payment transactions. In additional embodiments, an payment account includes one or more processing parameters with one or more parameter ranges for processing transactions involving the payment account.

In one or more embodiments, the account management system 114 includes the dynamic token mapping system 102 to facilitate processing of electronic payment transactions via one or more processing pipelines. Specifically, the dynamic token mapping system 102 communicates with the payment network 108 (e.g., a payment network associated with the client device 106 or another device) to initiate/process a payment transaction involving a payment account. For example, the dynamic token mapping system 102 receives transaction authorization requests from the payment network 108 for authorizing card-based/electronic payment transactions initiated via client devices (e.g., the client device 106).

Additionally, the dynamic token mapping system 102 communicates with the payment network 108 via an application programming interface ("API") to dynamically remap tokens associated with payment accounts in connection with selecting from a plurality of processing pipelines to process payment transactions. More specifically, the dynamic token mapping system 102 communicates with the payment network 108 to dynamically map a payment account for use in processing a future transaction via a particular processing pipeline. For example, the dynamic token mapping system 102 utilizes historical data associated with the payment account to intelligently remap the payment account to a particular processing pipeline corresponding to a particular sub-account of the payment account.

As used herein, the term "processing pipeline" refers to a specific set of operations performed by one or more computing devices to process a card-based/electronic payment transaction. For example, a processing pipeline includes a first set of servers/computing devices performing a first set of operations to process transactions for a debit processing pipeline. In another example, a processing pipeline includes a second set of servers/computing devices performing a second set of operations to process transactions routed for a credit processing pipeline. In one or more embodiments, the payment network 108 processes a particular payment transaction via a processing pipeline (e.g., a debit bin or a credit bin) according to a token in connection with the payment transaction.

In some instances, the dynamic token mapping system 102 communicates with the third-party system 110 to authorize payment transactions. In some embodiments, the third-party system 110 includes an external gateway and/or an external funding source. For example, the dynamic token mapping system 102 can request authorization from the third-party system 110 while also providing control over one or more aspects of the processing of a payment transaction, such as by determining processing parameters associated with the payment transaction. Additionally, the third-party system 110 can perform one or more operations associated with dynamically mapping a token for a payment account, such as by generating, utilizing, or providing a tokenizing model. In one or more embodiments, the third-party system 110 includes a separate entity external to the payment network 108 and the server(s) 104 (e.g., separate from the account management system 114 and the dynamic token mapping system 102).

Additionally, as used herein, the term "payment transaction" refers to a transaction in which a payment account funds a payment from a user to a recipient. To illustrate, a payment transaction includes a card-based transaction involving the use of a physical card or a digital card. Alternatively, a payment transaction can include an electronic transaction without a payment card, such as an ACH transaction. For instance, a payment transaction includes a transaction via a point-of-sale device or an electronic transaction via a mobile application or online application between a payment account of a user and a recipient account associated with a recipient (e.g., another user or a merchant system) in a peer-to-peer transaction or a peer-to-business transaction.

In one or more embodiments, in connection with managing cards for payment card accounts and/or processing electronic card transactions involving payment card accounts, the account management system 114 and/or the dynamic token mapping system 102 provides software and/or hardware for interacting with one or more systems or devices (e.g., the third-party system 110, a client device associated with an account program manager) in the system environment 100. For example, the dynamic token mapping system 102 provides one or more APIs for the systems or devices to dynamically map a token for a payment account for a particular payment transaction or to perform downstream operations associated with payment transactions.

In one or more embodiments, the server(s) 104 include a variety of computing devices, including those described below with reference to FIG. 8. For example, the server(s) 104 includes one or more servers for storing and processing data associated with payment transactions and dynamic token mapping. In some embodiments, the server(s) 104 also include a plurality of computing devices in communication with each other, such as in a distributed storage environment. In some embodiments, the server(s) 104 communicate with a plurality of issuing systems and issuing system devices or other systems and devices of one or more entities based on established relationships between the account management system 114, the dynamic token mapping system 102, and the one or more entities. To illustrate, the server(s) 104 communicate with various entities or systems including financial institutions (e.g., issuing banks associated with payment cards via the payment network 108), payment card networks associated with processing payment transactions involving payment accounts, payment cards, payment gateways (e.g., the third-party system 110), merchant systems, client devices, or other systems.

In addition, in one or more embodiments, the account management system 114 and/or the dynamic token mapping system 102 are implemented on one or more servers. For example, the account management system 114 and/or the dynamic token mapping system 102 can be partially or fully implemented on a plurality of servers. To illustrate, the account management system 114 and the dynamic token mapping system 102 can be implemented in a distributed environment. In one or more embodiments, each server handles requests for managing accounts or processing payment transactions.

In one or more embodiments, the client device 106 includes a computing device that initiates electronic payment transactions via the payment network 108. For example, the client device 106 includes a user device, such as a smartphone, desktop computer, laptop, or other computing device that enables electronic payment transactions with one or more entities (e.g., via web applications or standalone applications). In some embodiments, the client device 106 includes a recipient device that hosts a web application or standalone applications and communicates with the payment network 108 to initiate electronic payment transactions. In alternative examples, the client device 106 includes a point-of-sale device including a card reader, chip reader, or other device to initiate electronic payment transactions between a sending user and a recipient user.

Additionally, as shown in FIG. 1, the system environment 100 includes the network 112. The network 112 enables communication between components of the system environment 100. In one or more embodiments, the network 112 may include the Internet or World Wide Web. Additionally, the network 112 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server(s) 104, the account management system 114, the dynamic token mapping system 102, the client device 106, and the third-party system 110 communicate via the network 112 using one or more communication platforms and technologies suitable for transporting data and/or communication signals, including any known communication technologies, devices, media, and protocols supportive of data communications, examples of which are described with reference to FIG. 8. Additionally, in one or more embodiments, one or more of the various components of the system environment 100 communicate using protocols for financial information communications such as PCI standards or other protocols.

Figure 2:
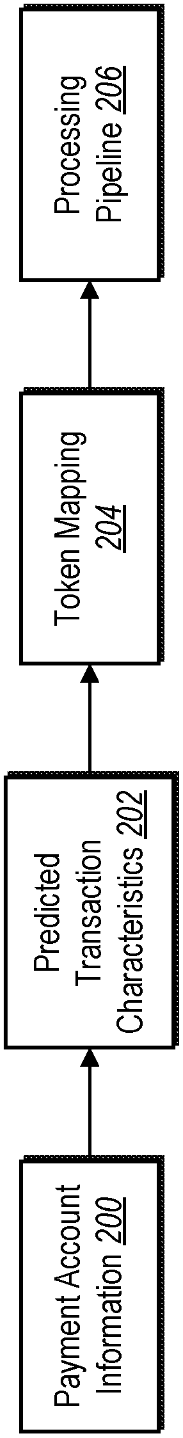
FIG. 2 illustrates a diagram of an overview of the dynamic token mapping system performing predictive token mapping for transaction routing in accordance with one or more implementations.

As mentioned, the dynamic token mapping system 102 provides dynamic tokenization for a payment account for a future transaction. FIG. 2 illustrates an overview of a process in which the dynamic token mapping system 102 dynamically maps a token for processing a future transaction based on information associated with a payment account. Specifically, FIG. 2 illustrates that the dynamic token mapping system 102 dynamically maps a token for processing a next subsequent payment transaction routed based on predicted transaction characteristics of the next subsequent payment transaction.

In one or more embodiments, as illustrated in FIG. 2, the dynamic token mapping system 102 determines payment account information 200 associated with a payment account. Specifically, the dynamic token mapping system 102 determines historical data associated with a plurality of previous transactions that occurred in connection with the payment account. Additionally, FIG. 2 illustrates that the dynamic token mapping system 102 determines predicted transaction characteristics 202 for a future transaction based on the payment account information 200.

According to one or more embodiments, the dynamic token mapping system 102 determines a token mapping 204 for the payment account based on the predicted transaction characteristics 202. In particular, the dynamic token mapping system 102 determines whether the future transaction is likely to correspond to a particular sub-account of the payment account based on the payment account information 200 for previous transactions and/or additional data associated with the payment account. For example, the dynamic token mapping system 102 communicates with a payment network to generate a token or remap a token to a particular processing pipeline for use in processing a future transaction.

Figure 4:
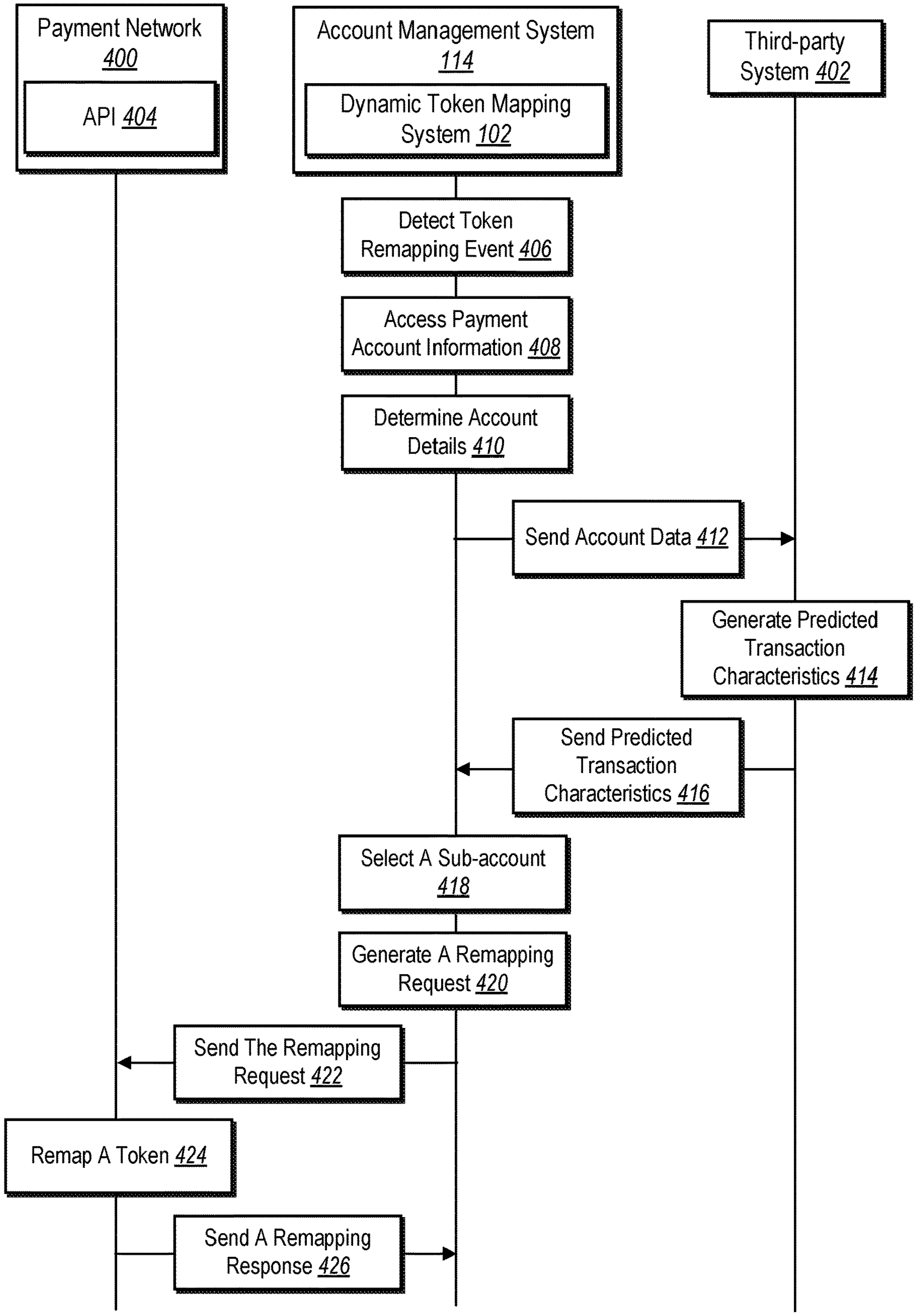
FIG. 4 illustrates a flow diagram of the dynamic token mapping system dynamically mapping a token for a payment account based on predicted transaction characteristics in accordance with one or more implementations.
Figure 5:
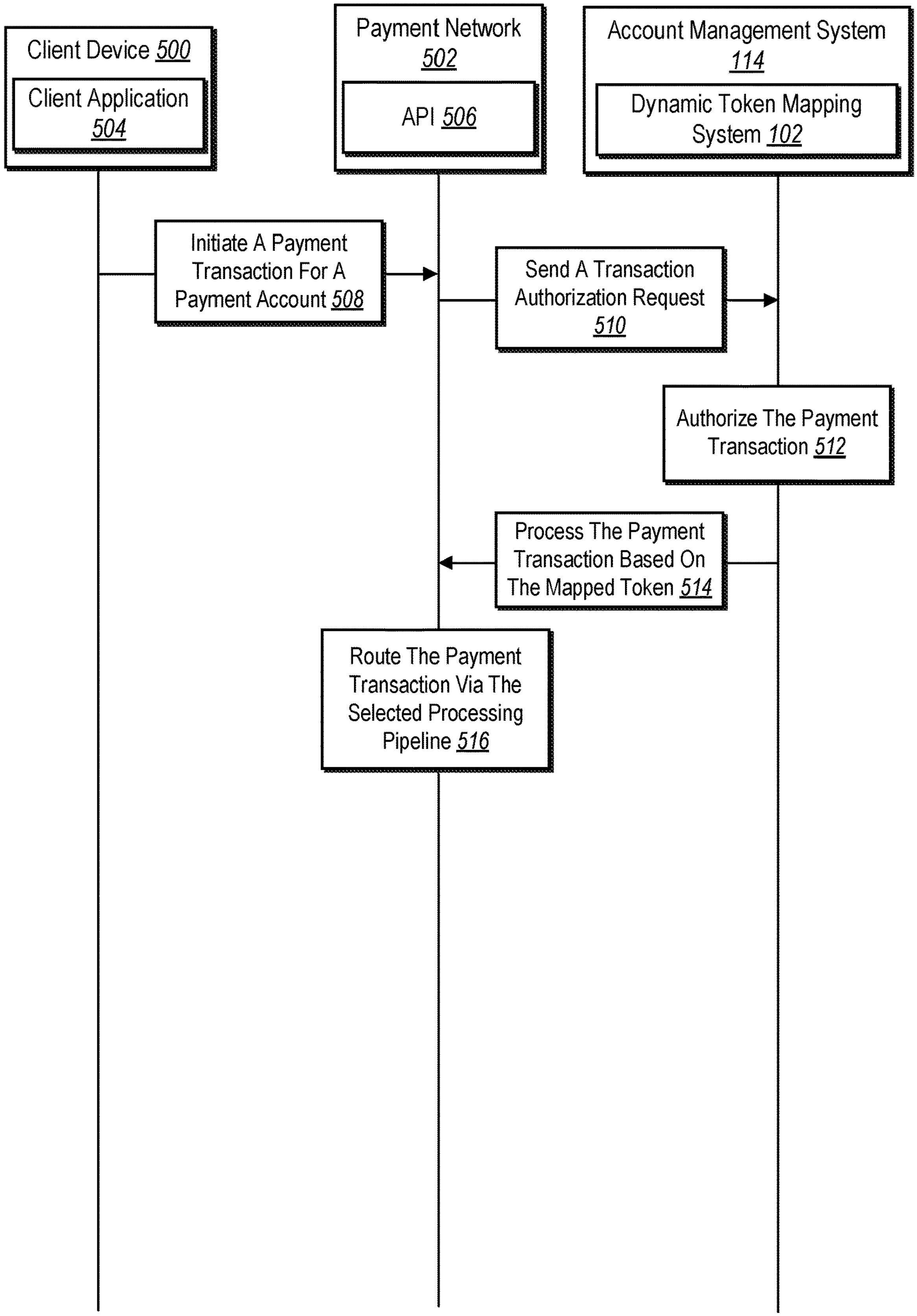
FIG. 5 illustrates a flow diagram of the dynamic token mapping system processing a payment transaction with a dynamically mapped token in accordance with one or more implementations.

FIG. 2 also illustrates that the dynamic token mapping system 102 determines a processing pipeline 206 for a subsequent transaction based on a corresponding token mapping. For example, the dynamic token mapping system 102 determines to process the subsequent transaction utilizing a specific sub-account corresponding to a particular processing pipeline according to a previously mapped token provided in connection with the subsequent transaction. FIGS. 4-5 and the corresponding description provide additional detail related to performing the operations described above in relation to FIG. 2.

Figure 3:
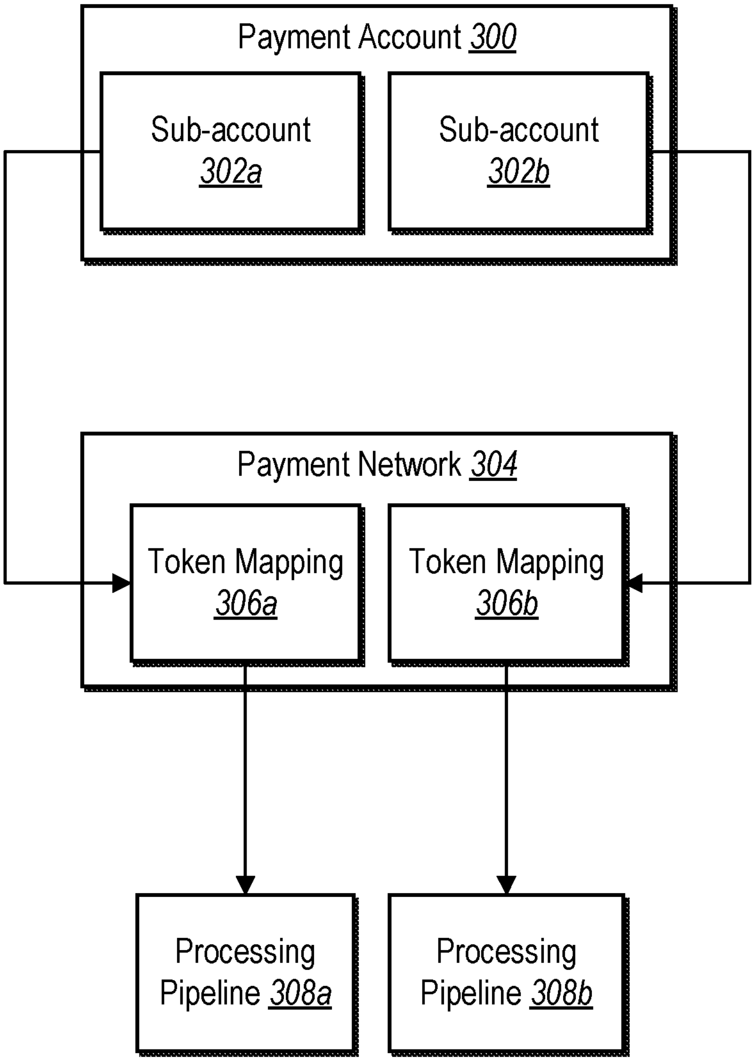
FIG. 3 illustrates a diagram of token mappings for sub-accounts of a payment account in connection with a plurality of processing pipelines in accordance with one or more implementations.

FIG. 3 illustrates a diagram of token mappings for processing payment transactions in connection with various sub-accounts of a payment account. Specifically, a payment account 300 includes a plurality of sub-accounts that are connected to the payment account 300. For example, FIG. 3 illustrates that the payment account includes a first sub-account **302*a* and a second sub-account 302*b*. To illustrate, as previously mentioned, the first sub-account 302*a* corresponds to a debit account tied to the payment account 300 (e.g., a debit portion of the payment account 300), and the second sub-account 302*b* corresponds to a credit account tied to the payment account 300 (e.g., a credit portion of the payment account 300). Alternatively, the first sub-account 302*a* corresponds to a first debit (or credit) portion of the payment account 300, and the second sub-account 302*b* corresponds to a second debit (or credit) portion of the payment account 300—the first debit portion being managed separately from the second debit portion. Although FIG. 3 illustrates the payment account 300** including two sub-accounts, a payment account may have more than two separate sub-accounts connected to the payment account corresponding to one or more account types.

Additionally, in one or more embodiments, each sub-account of a payment account includes different limits and/or available balances. For example, the first sub-account 302*a* can include a first limit and a first available balance, while the second sub-account 302*b* can include a second limit and a second available balance. To illustrate, the first sub-account 302*a* can include a debit account for which the first limit is a specific amount (e.g., $5000) based on what a person has loaded into the first sub-account 302*a*—the first available balance may be the same as the first limit, as in the case of a debit account. Additionally, the second sub-account 302*b* can include a credit account for which the second limit is a specific amount (e.g., $500) with the second available balance of a different amount (e.g., $350) based on transactions that have hit the second sub-account 302*b*.

As illustrated in FIG. 3, the sub-accounts of the payment account 300 correspond to separate token mappings. In particular, a payment network 304 generates a token representing a payment account for use in payment transactions. Additionally, the payment network 304 maps the token representing the payment account according to separate sub-accounts of payment accounts. Specifically, the payment network 304 determines a first token mapping 306*a* corresponding to the first sub-account 302*a* and a second token mapping 306*b* corresponding to the second sub-account 302*b*. In some embodiments, the first token mapping 306*a* and the second token mapping 306*b* map a single token to different processing pipelines. Alternatively, the first token mapping 306*a* and the second token mapping 306*b* involves generating separate tokens and mappings for different processing pipelines.

As used herein, the term "token" refers to an identifier value representing a payment account. In one or more embodiments, a token includes a plurality of numerical values that the payment network 304 and/or other systems involved in processing transactions identify as representing a payment account. To illustrate, the payment network 304 generates a token as a 16-digit number (or other number of digits) similar to a payment account number for a corresponding payment account (e.g., to obfuscate the payment account number). A token can include a randomly generated number or a number generated according to a specific algorithm. Alternatively, a token includes any identifier that the payment network 304 and/or the dynamic token mapping system 102 utilizes to identify a particular payment account (e.g., a non-obfuscated payment account number).

In one or more embodiments, as illustrated in FIG. 3, each token mapping corresponds to a particular processing pipeline. For example, the payment network 304 utilizes a first processing pipeline 308*a* to process payment transactions involving the first token mapping 306*a*. Additionally, the payment network 304 utilizes a second processing pipeline 308*b* to process payment transactions involving the second token mapping 306*b*. As described in more detail below, the dynamic token mapping system 102 utilizes token remapping to switch between different sub-accounts according to predicted transaction characteristics of future transactions. Accordingly, the dynamic token mapping system 102 selects a corresponding processing pipeline based on the predicted transaction characteristics.

FIG. 4 illustrates a flow diagram of the dynamic token mapping system 102 remapping a token for a future subsequent transaction. Specifically, FIG. 4 illustrates that the account management system 114 and the dynamic token mapping system 102 communicate with a payment network 400 and a third-party system 402 in connection with dynamically remapping a token for a payment account. As illustrated, the payment network 400 includes an API 404 that the payment network 400 exposes to the account management system 114 and the dynamic token mapping system 102 for processing transactions and mapping tokens for payment accounts.

In one or more embodiments, as mentioned, the dynamic token mapping system 102 provides dynamic token mapping for a payment account prior to initiation of a future payment transaction. As illustrated in FIG. 4, the dynamic token mapping system 102 performs an act 406 of detecting a token remapping event in connection with a payment account. For example, the dynamic token mapping system 102 detects a token remapping event to remap a payment account to a processing pipeline (or corresponding sub-account) in response to one or more operations or indications of operations. To illustrate, a token remapping event includes, but is not limited to, an indication of a completed payment transaction for the payment account, a request to remap a token for the payment account, or an indication of changes to account details associated with the payment account (e.g., any server event that impacts or touches an account balance such as a withdrawal or currency conversion event).

As illustrated in FIG. 4, in response to the token remapping event, the dynamic token mapping system 102 performs an act 408 of accessing payment account information of a payment account. Specifically, the dynamic token mapping system 102 accesses data associated with a plurality of previous payment transactions involving the payment account. For example, the dynamic token mapping system 102 determines payment amounts and/or other details associated with the previous payment transactions (e.g., geolocation, recipients, transaction types, timestamps) via an account history of the payment account. The payment account information can also include historical pricing information involving the payment account, a credit history/score, merchant/recipient information (e.g., identifiers, locations), and available balances of sub-accounts of the payment account. In one or more embodiments, the dynamic token mapping system 102 and/or the account management system 114 stores the payment account information for the payment account. Alternatively, the dynamic token mapping system 102 accesses the payment account information from the third-party system 402 or the payment network 400 (e.g., via the API 404).

According to one or more embodiments, the dynamic token mapping system 102 also performs an act 410 of determining account details for the payment account. For instance, the dynamic token mapping system 102 determines one or more sub-accounts associated with the payment account and/or one or more account types of the one or more sub-accounts. Additionally, the dynamic token mapping system 102 can determine an available balance for each sub-account of the payment account (e.g., an available credit of a credit sub-account). The dynamic token mapping system 102 can also determine historical data associated with the account details (e.g., a historical/average available balance, repayment history).

As illustrated in FIG. 4, the dynamic token mapping system 102 performs an act 412 of sending account data to the third-party system 402. In particular, the dynamic token mapping system 102 can send the account history and/or the account data to the third-party system 402. To illustrate, the dynamic token mapping system 102 sends payment amounts, timestamps, or other data associated with the previous payment transactions for the payment account to the third-party system.

In one or more embodiments, in response to receiving the account data from the dynamic token mapping system 102, the third-party system 402 performs an act 414 of generating predicted transaction characteristics for a future transaction involving the payment account. Specifically, the third-party system 402 can utilize a prediction model to predict transaction characteristics of a next subsequent payment transaction to occur for the payment account (e.g., a payment transaction that has not yet occurred). For example, the third-party system 402 generates a predicted payment amount and/or other details of the next subsequent payment transaction based on historical payment amounts/details of previous transactions. To illustrate, the third-party system 402 generates the predicted transaction characteristics based on a model or algorithm that identifies trends or specific statistics in a dataset (e.g., a regression model).

In one or more examples, the dynamic token mapping system 102 or the third-party system 402 determines an average transaction size/amount associated with the payment account based on the account history and generates the predicted transaction characteristics based on the average transaction size. In additional embodiments, the dynamic token mapping system 102 or the third-party system 402 generates a predicted transaction type, predicted transaction location, predicted recipient, or other details associated with a future transaction. To illustrate, the dynamic token mapping system 102 or the third-party system 402 utilizes characteristics of previous transactions including transaction times, recipients, geolocations, etc., to generate the predicted transaction characteristics. Additionally, the dynamic token mapping system 102 can utilize additional details such as a current time, seasonal information, recurring transactions, or other information to generate one or more predicted transaction characteristics for the future transaction.

As illustrated in FIG. 4, the third-party system 402 also performs an act 416 of sending the predicted transaction characteristics to the dynamic token mapping system 102. Alternatively, in one or more embodiments, the dynamic token mapping system 102 utilizes a prediction model to generate predicted transaction characteristics instead of the third-party system 402. In some embodiments, the dynamic token mapping system 102 and the third-party system generate one or more predicted transaction characteristics—e.g., the dynamic token mapping system 102 generates a first predicted transaction characteristic and the third-party system 402 generates a second predicted transaction characteristic.

In additional embodiments, the third-party system 402 or the dynamic token mapping system 102 generates the predicted transaction characteristics by utilizing a machine-learning model trained on the account history and/or other details associated with the payment account. As used herein, the term "machine-learning model" refers to one or more computer algorithms that can be tuned (e.g., trained) based on inputs to approximate unknown functions. In particular, a machine-learning model utilizes algorithms to learn from, and make determinations on, known data by analyzing the known data to learn to generate outputs that reflect patterns and attributes of the known data. For instance, a machine-learning model can include, but is not limited to, one or more neural network layers, such as a multi-layer perceptron, a convolutional neural network, a recurrent neural network, a feed forward neural network, or any combination thereof. A machine-learning model can learn high-level abstractions in data to generate data-driven determinations, predictions, or decisions from the known input data. To illustrate, the dynamic token mapping system 102 utilizes one or more recurrent neural networks to predict characteristics of a next subsequent transaction based on parameters learned from historical transaction data of previous transactions associated with a payment account.

In one or more embodiments, the dynamic token mapping system 102 approves a prediction model at the third-party system 402. For example, in connection with generating predicted transaction characteristics for dynamically performing token mapping for a payment account, the dynamic token mapping system 102 can obtain a prediction model from the third-party system 402. The dynamic token mapping system 102 can validate the prediction model and/or perform one or more quality checks to determine whether the third-party system 402 can utilize the prediction model or should update the prediction model. To illustrate, the dynamic token mapping system 102 validates the prediction model by verifying that the prediction model generates results that fall within one or more threshold values associated with one or more ground-truth values. As an example, the dynamic token mapping system 102 validates the prediction model in response to determining that differences between predicted transaction characteristics and ground-truth transaction characteristics for a plurality of previous transactions falls within threshold values.

In some embodiments, the dynamic token mapping system 102 utilizes an additional prediction model (e.g., a separate prediction model or a copy of the prediction model from the third-party system 402) to validate the prediction model and/or the predicted transaction characteristics. To illustrate, the third-party system 402 can provide a validation model to the dynamic token mapping system 102 prior to generating predicted transaction characteristics. Additionally, in response to receiving predicted transaction characteristics for a particular future transaction, the dynamic token mapping system 102 can utilize a validation model provided by the third-party system 402 to validate/verify the predicted transaction characteristics. In some embodiments, in response to detecting a discrepancy between the predicted transaction characteristics received from the third-party system 402 and predicted transaction characteristics generated via the validation model, the dynamic token mapping system 102 notifies the third-party system 402 of the discrepancy. Additionally, the dynamic token mapping system 102 can determine not to perform a token remapping operation based on the discrepancy.

According to one or more embodiments, the dynamic token mapping system 102 performs an act 418 of selecting a sub-account of a payment account. In particular, the dynamic token mapping system 102 selects a sub-account from a plurality of sub-accounts connected to the payment account according to one or more rules based on one or more thresholds and/or comparisons. For instance, the dynamic token mapping system 102 utilizes the previously determined account details to select the sub-account. To illustrate, the dynamic token mapping system 102 determines whether the predicted transaction characteristics meet a particular threshold or risk level, such as determining whether a predicted payment amount exceeds an available balance of a particular sub-account or has a risk level below a certain value. In response to determining that the predicted transaction/payment amount of the next subsequent payment transaction does not exceed the available balance of the sub-account, the dynamic token mapping system 102 can select the sub-account. Alternatively, in response to determining that the predicted payment amount does exceed the available balance of the sub-account, the dynamic token mapping system 102 can select another sub-account.

Additionally, in some embodiments, the dynamic token mapping system 102 compares a particular predicted transaction characteristic to a threshold. For example, the dynamic token mapping system 102 can determine whether to select a particular sub-account in response to determining that a predicted transaction size (or other predicted transaction characteristic associated with the next subsequent transaction) meets a threshold multiplier of an available balance of the sub-account. To illustrate, the dynamic token mapping system 102 can select a credit sub-account in response to determining that the predicted transaction size is less than 80% (or other threshold such as 75% or 90%) of the available credit of the credit sub-account.

In additional embodiments, the dynamic token mapping system 102 utilizes additional predicted transaction characteristics (e.g., other than payment amount) to select a sub-account. For example, the dynamic token mapping system 102 can determine whether the subsequent payment transaction is likely to correspond to a particular recipient identifier, geolocation, etc. The dynamic token mapping system 102 can utilize a plurality of thresholds, comparisons, or account values to determine whether to select a particular sub-account.

According to one or more embodiments, the dynamic token mapping system 102 performs an act 420 of generating a remapping request to send to the payment network 400. In particular, the dynamic token mapping system 102 generates the remapping request including an identifier for the sub-account or an identifier of a token associated with the selected sub-account. For example, the dynamic token mapping system 102 generates an API call to the payment network 400 via the API 404 provided by the payment network 400. To illustrate, the dynamic token mapping system 102 utilizes an API corresponding to a token remapping operation provided in connection with changing a token mapping associated with the payment account at the payment network 400. As illustrated in FIG. 4, the dynamic token mapping system 102 performs an act 422 of sending the remapping request to the payment network 400.

In one or more embodiments, the payment network 400 performs an act 424 of remapping a token for a payment account. Specifically, in response to receiving the remapping request, the payment network 400 remaps the payment account to a processing pipeline corresponding to the selected sub-account. For instance, the payment network 400 changes a stored value representing the payment account to a particular processing pipeline (e.g., debit) to the selected sub-account. Alternatively, the payment network 400 changes the stored value representing the payment account to a particular processing pipeline (e.g., credit) corresponding to the selected sub-account. In one or more embodiments, the payment network 400 stores the token mapping in advance of the next subsequent transaction. In one or more embodiments, remapping a token for a payment account involves generating/swapping a token associated with a payment account in connection with a particular processing pipeline.

As illustrated in FIG. 4, the payment network 400 also performs an act 426 of sending a remapping response to the dynamic token mapping system 102. To illustrate, the payment network 400 can generate the remapping response to include an indication of the payment remapping for the payment account in response to remapping the token in connection with the selected sub-account. Accordingly, the dynamic token mapping system 102 receives the indication of the token remapping associated with the sub-account for use in processing payment transactions via a processing pipeline corresponding to the selected sub-account. In additional embodiments, the payment network 400 provides a new token within the remapping response in response to generating a new token in connection with the token remapping operation.

FIG. 5 illustrates a flow diagram of the dynamic token mapping system 102 utilizing a dynamically mapped token to process a payment transaction. Specifically, FIG. 5 illustrates a client device 500, a payment network 502, and the account management system 114 including the dynamic token mapping system 102. Additionally, FIG. 5 illustrates that the client device 500 includes a client application 504, and the payment network 502 includes an API 506.

As illustrated in FIG. 5, the client device 500 performs an act 508 (e.g., utilizing the client application 504) of initiating a payment transaction for a payment account. Specifically, the payment transaction can include a next subsequent payment transaction after mapping the token. For example, the client device 500 can include a merchant device/system that initiates a payment transaction in response to a card swipe or transaction request from an account holder. Alternatively, the client device 500 can include an account holder device (e.g., a smartphone) that includes a web browser or payment transaction application that initiates a payment transaction in response to an electronic payment transaction request. In one or more embodiments, the request to initiate the payment transaction includes a payment account number or a tokenized payment account number (e.g., for security reasons) provided by the client device 500 to the payment network 502.

In response to receiving the request to initiate the payment transaction, the payment network 502 performs an act 510 of sending a transaction authorization request. In one or more embodiments, the dynamic token mapping system 102 determines a mapped token corresponding to the payment transaction based on the payment transaction (e.g., by parsing the payment transaction). In some embodiments, the payment network 502 generates an additional token representing the mapped token (e.g., to further obfuscate the token) to provide to a device of an account holder. Alternatively, the payment transaction includes a separate payment token corresponding to the mapped token or based on an additional mapping between a payment account number of the payment account and the mapped token. The payment network 502 can send the transaction authorization request including the mapped token and/or a payment account number for identifying the payment account in connection with the payment transaction.

As illustrated in FIG. 5, the dynamic token mapping system 102 performs an act 512 of authorizing the payment transaction. In one or more embodiments, the dynamic token mapping system 102 sends a request to authorize the payment transaction to a third-party system, such as an external gateway or a third-party funding source. Alternatively, the dynamic token mapping system 102 manages a funding source for the payment account and authorizes the payment transaction.

As illustrated in FIG. 5, the dynamic token mapping system 102 performs an act 514 of processing the transaction based on the mapped token. Specifically, the dynamic token mapping system 102 determines which sub-account to use in connection with processing/authorizing the payment transaction based on the mapped token. The dynamic token mapping system 102 can process the payment transaction according to the selected sub-account. For instance, in response to the mapped token corresponding to a credit sub-account of the payment account, the dynamic token mapping system 102 provides the mapped token to the payment network 502 for processing via a processing pipeline corresponding to the selected sub-account.

In one or more embodiments, as illustrated in FIG. 5, the payment network 502 performs an act 516 of routing the payment transaction via the selected processing pipeline. For example, the payment network 502 can utilize one or more specific devices and/or one or more specific operations of the selected processing pipeline to process the payment transaction. To illustrate, the payment network 502 converts the token to the payment account number of the payment account (or otherwise determines a particular payment account number) based on the previously generated mapping. The payment network 502 also determines a processing pipeline based on the mapped token. Thus, in response to dynamically mapping a token for a different sub-account of a payment account, the payment network 502 utilizes a different processing pipeline for the separate token mapping.

Figure 6:
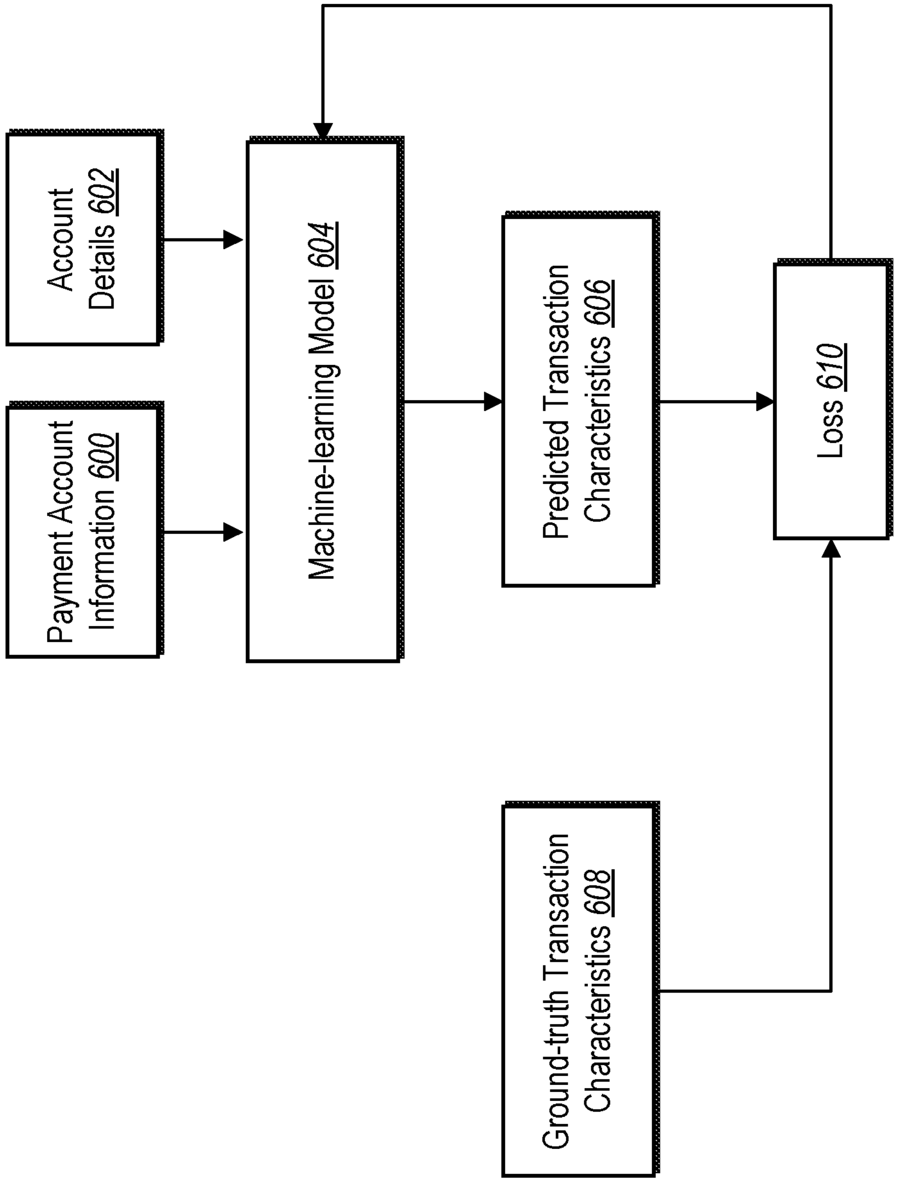
FIG. 6 illustrates a diagram of the dynamic token mapping system training a machine-learning model to generate predicted transaction characteristics in accordance with one or more implementations.

As mentioned, the dynamic token mapping system 102 can generate predicted transaction characteristics based on previous transactions associated with a payment account. FIG. 6 illustrates an embodiment of the dynamic token mapping system 102 training a machine-learning model based on data associated with a payment account. Specifically, FIG. 6 illustrates that the dynamic token mapping system 102 determines payment account information 600 and account details 602 associated with the payment account to determine data for a plurality of previous payment transactions and current parameters for the payment account. For example, the dynamic token mapping system 102 determines payment amounts and/or other details associated with previous transactions and a current available balance for the payment account (including for sub-accounts of the payment account).

The dynamic token mapping system 102 provides the payment account information 600 and the account details 602 to a machine-learning model 604. For instance, as previously described, the machine-learning model 604 can include a recurrent neural network, convolutional neural network, regression model, or other model. The dynamic token mapping system 102 can train the machine-learning model 604 (e.g., learn parameters for the machine-learning model 604) based on the account details 602 and the machine-learning model 604.

To illustrate, the dynamic token mapping system 102 utilizes the machine-learning model 604 to generate predicted transaction characteristics 606 for a future transaction. For example, during training, the dynamic token mapping system 102 generates the predicted transaction characteristics 606 for a transaction that has not yet occurred. Alternatively, the dynamic token mapping system 102 generates the predicted transaction characteristics for a transaction that occurred chronologically after the account history (e.g., a past transaction that in a testing dataset separate from a training dataset).

In one or more embodiments, as illustrated in FIG. 6, the dynamic token mapping system 102 trains the machine-learning model 604 by comparing the predicted transaction characteristics 606 to ground-truth transaction characteristics 608. For example, the dynamic token mapping system 102 determines the ground-truth transaction characteristics 608 based on stored data for the payment transaction. To illustrate, the dynamic token mapping system 102 determines the ground-truth transaction characteristics 608 after receiving the next subsequent payment transaction or in connection with a previously stored payment transaction sequentially after the previous transactions in the payment account information 600.

Additionally, in connection with comparing the predicted transaction characteristics 606 to the ground-truth transaction characteristics 608, the dynamic token mapping system 102 determines a loss 610. For example, the dynamic token mapping system 102 determines one or more value differences between the predicted transaction characteristics 606 and the ground-truth transaction characteristics 608. Furthermore, the dynamic token mapping system 102 can utilize one or more loss functions to determine the loss 610 based on the difference, such as, but not limited to, a mean absolute error loss function or a mean squared error loss function. The dynamic token mapping system 102 can utilize the loss to further train the machine-learning model 604 (e.g., by learning/modifying parameters of the machine-learning model 604).

The dynamic token mapping system 102 can thus train the machine-learning model 604 and utilize the machine-learning model 604 to dynamically map tokens for processing payment accounts. By training the machine-learning model 604 based on an account history and/or other details associated with a payment account, the dynamic token mapping system 102 can train the machine-learning model 604 to learn factors such as time of day, seasonality, geolocation, etc., that may indicate what the transaction characteristics of the next subsequent payment transaction are likely to be. The dynamic token mapping system 102 can continue improving the machine-learning model 604 after each new transaction (or after a batch of transactions) to learn new trends for the payment account.

Figure 7:
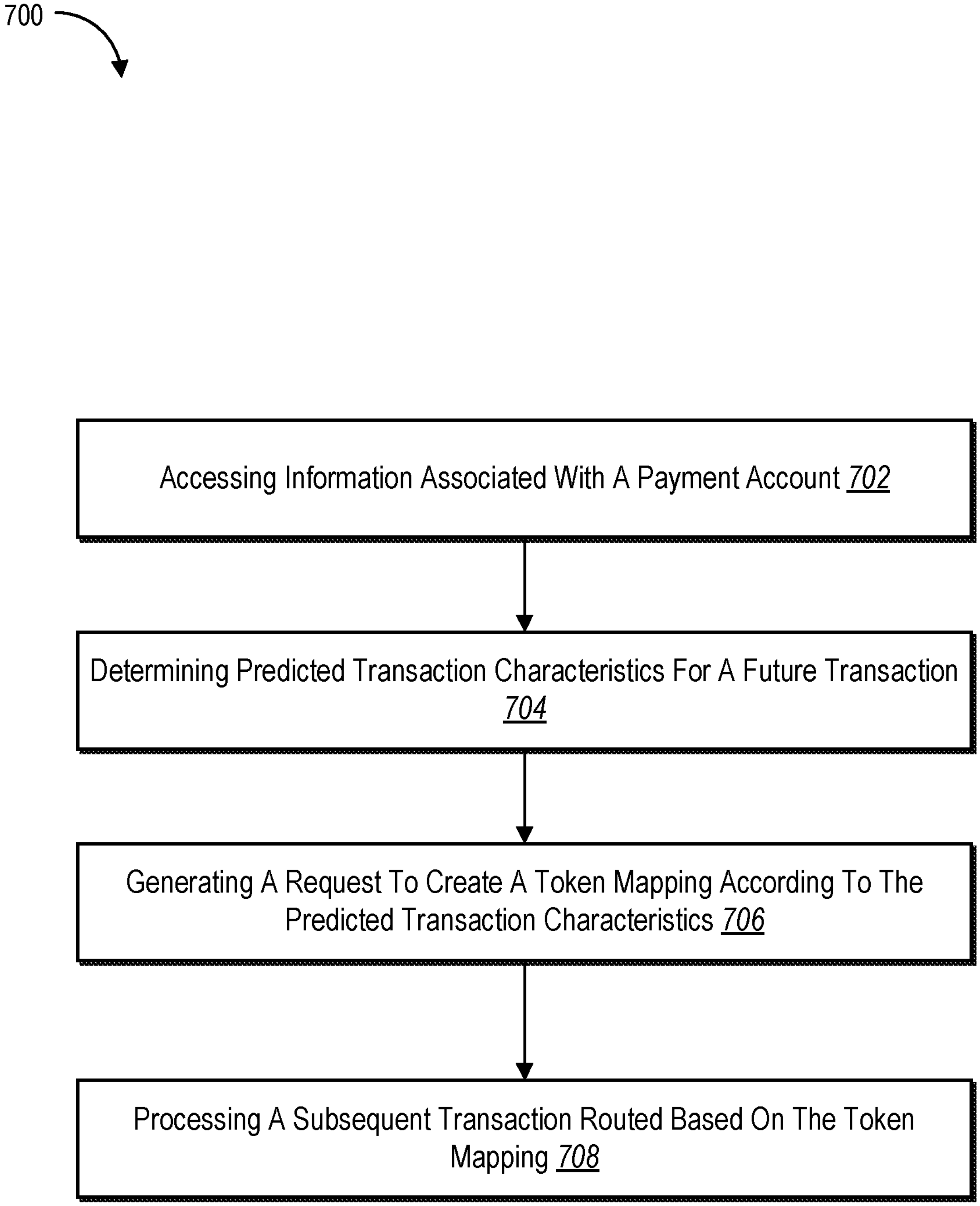
FIG. 7 illustrate a flowchart of a series of acts for dynamically mapping a token for a payment account according to predicted transaction characteristics in accordance with one or more implementations.

Turning now to FIG. 7, this figure shows a flowchart of a series of acts 700 of dynamically mapping a token for a payment account according to predicted transaction characteristics. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions, that when executed by one or more processors, cause a computing device to perform the acts of FIG. 7. In still further embodiments, a system can perform the acts of FIG. 7.

As shown in FIG. 7, the series of acts 700 includes an act 702 of accessing information associated with a payment account. For example, act 702 involves accessing, by one or more servers of an account management system, information associated with a payment account comprising characteristics of a plurality of previous transactions associated with a payment account, the payment account corresponding to a plurality of separate sub-accounts.

Act 702 can involve determining a credit score associated with the payment account, recipient information of the plurality of previous transactions, geographical locations associated with the plurality of previous transactions, payment amounts associated with the plurality of previous payment transactions, or available balances of the plurality of separate sub-accounts.

The series of acts 700 also includes an act 704 of determining predicted transaction characteristics for a future transaction. For example, act 704 involves determining, by the one or more servers of the account management system, predicted transaction characteristics for a future transaction based on the information associated with the payment account.

Act 704 can involve generating, utilizing a prediction model, a predicted transaction amount associated with the future transaction according to a plurality of transaction amounts associated with the plurality of previous transactions. Act 704 can involve generating, utilizing a machine-learning model comprising parameters trained utilizing the information associated with the payment account, the predicted transaction characteristics for the future transaction according to one or more trends in the information associated with the payment account. For example, act 704 can involve determining, utilizing a machine-learning model, a predicted transaction amount for the future transaction according to the transaction amounts of the plurality of previous transactions.

Act 704 can involve determining an average transaction amount of the plurality of previous transactions associated with the payment account. Act 704 can further involve determining the predicted transaction characteristics based on the average transaction amount.

Act 704 can involve providing the information associated with the payment account to a third-party system corresponding to the payment account. Act 704 can also involve receiving the predicted transaction characteristics for the future transaction from the third-party system.

Act 704 can involve validating a prediction model provided by a third-party system corresponding to the payment account via one or more quality checks. Act 704 can also involve determining the predicted transaction characteristics utilizing the prediction model based on validating the prediction model.

Act 704 can involve receiving a validation model from the third-party system in connection with a prediction model that the third-party system utilizes to generate predicted transaction characteristics for future transactions. Act 704 can also involve validating, utilizing the validation model, predicted transaction characteristics received from the third-party system.

Additionally, the series of acts 700 includes an act 706 of generating a request to create a token mapping according to the predicted transaction characteristics. For example, act 706 involves generating, by the one or more servers of the account management system, a request to a payment network to create a token mapping in connection with a selected sub-account of the payment account according to the predicted transaction characteristics for the future transaction and a set of rules.

Act 706 can involve determining that the predicted transaction characteristics correspond to a sub-account of a plurality of sub-accounts of the payment account according to account details of the sub-account of the plurality of sub-accounts. Act 706 can involve selecting the sub-account of the plurality of sub-accounts of the payment account in response to determining that the predicted transaction characteristics correspond to the sub-account of the plurality of sub-accounts. Act 706 can also involve generating, via an application programming interface call to the payment network, the request to create the token mapping in connection with the selected sub-account of the plurality of sub-accounts.

Act 706 can involve determining one or more characteristics of the sub-account of the plurality of sub-accounts based on the information associated with the payment account. Act 706 can also involve comparing the predicted transaction characteristics to the one or more characteristics of the sub-account.

Act 706 can involve determining that the predicted transaction characteristics correspond to a credit sub-account of the payment account. For example, act 706 can involve determining that a predicted payment amount of the future transaction is less than an available balance of the credit sub-account. Act 706 can also involve generating, via an application programming interface call to the payment network, the request to create the token mapping in connection with the credit sub-account of the payment account.

Act 706 can involve detecting a change to one or more account details associated with the payment account. Act 706 can involve accessing the information associated with the payment account to determine the characteristics of the plurality of previous transactions in response to the change to the one or more account details associated with the payment account. For example, act 706 can involve detecting a token remapping event comprising an indication of a completed payment transaction for the payment account, a request to remap a token for the payment account, or an indication of changes to account details associated with the payment account. Act 706 can also involve accessing the information associated with the payment account to determine the characteristics of the plurality of previous transactions in response to the token remapping event.

The series of acts 700 further includes an act 708 of processing a subsequent transaction routed based on the token mapping. For example, act 708 involves processing, by the one or more servers of the account management system, a subsequent transaction routed based on the token mapping in connection with the selected sub-account. Act 708 can also involve sending, in connection with routing the subsequent transaction, the token corresponding to the credit sub-account to the payment network to process via a processing pipeline corresponding to the credit sub-account.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
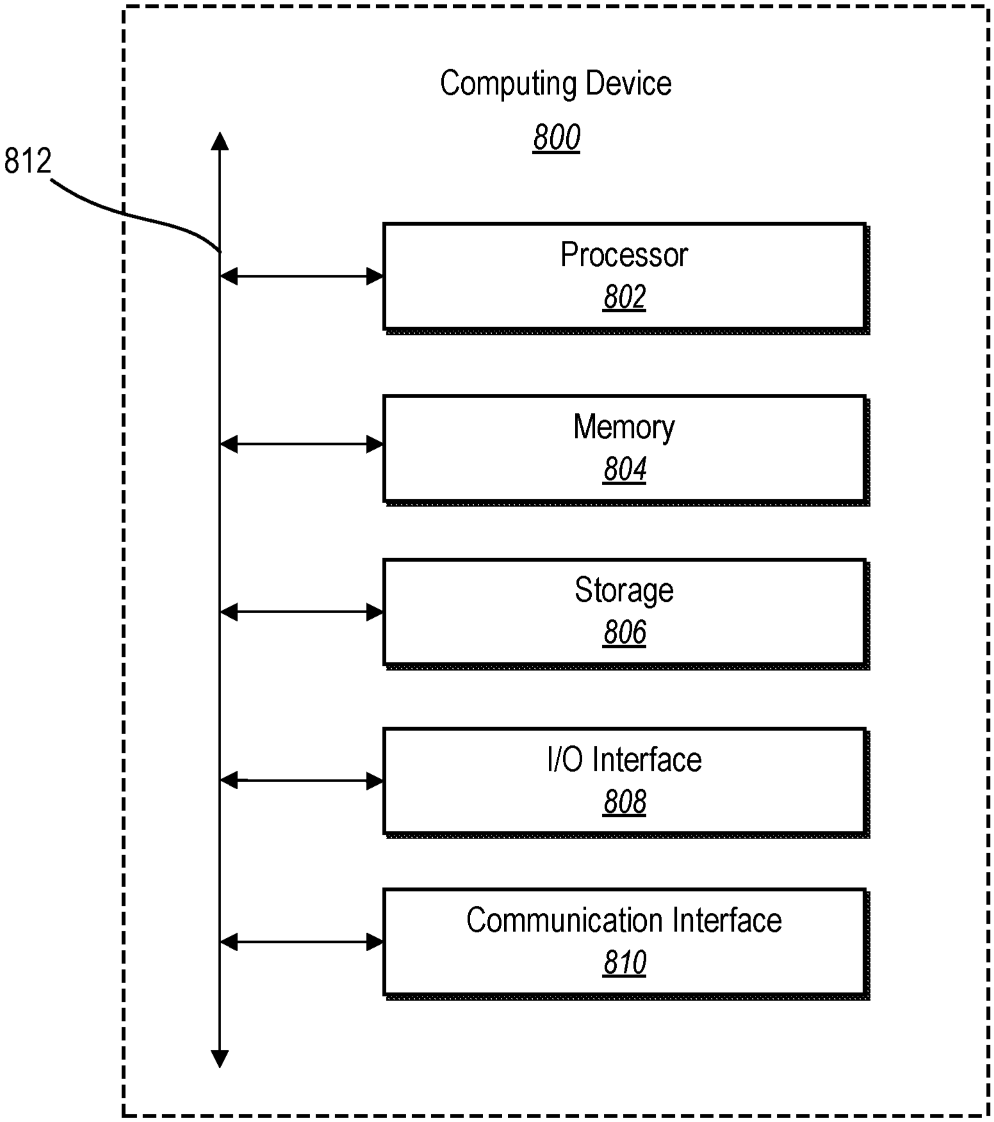
FIG. 8 illustrates a block diagram of an exemplary computing device in accordance with one or more implementations.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:

accessing, by one or more servers of an account management system, information associated with a payment account comprising characteristics of a plurality of previous transactions associated with the payment account in response to a token remapping event for the payment account, the payment account corresponding to a plurality of separate sub-accounts including a debit sub-account and a credit sub-account, wherein a single physical or digital card of the payment account is tied to the payment account corresponding to the plurality of separate sub-accounts;

determining, by the one or more servers utilizing a prediction model of the account management system that is trained on payment account information and account details to predict transaction characteristics for future transactions, predicted transaction characteristics for a future transaction involving the single physical or digital card based on the information associated with the payment account, the predicted transaction characteristics comprising a predicted payment amount, a predicted transaction type, a predicted transaction location, a predicted transaction recipient, or a combination thereof;

generating additional predicted transaction characteristics utilizing a validation model different than the prediction model;

verifying the predicted transaction characteristics generated by the prediction model of the account management system by comparing the predicted transaction characteristics with the additional predicted transaction characteristics;

determining whether a discrepancy between the predicted transaction characteristics and the additional predicted transaction characteristics from the validation model satisfies a threshold associated with halting a token remapping operation associated with the future transaction;

generating, by the one or more servers of the account management system and based on verifying the predicted transaction characteristics utilizing the validation model, a request comprising an application programming interface call to a payment network to cause the payment network to perform the token remapping operation asynchronously from processing a subsequent transaction to create a token mapping between a payment account number of the payment account and a token of a selected sub-account of the payment account according to the predicted transaction characteristics for the future transaction and a set of rules by changing a stored value of the token mapping representing the payment account to a processing pipeline for the selected sub-account; and processing, by the one or more servers of the account management system, the subsequent transaction initiated using the single physical or digital card of the payment account routed to a debit processing pipeline or a credit processing pipeline via the payment network based on the token mapping between the payment account and the selected sub-account, wherein the token remapping operation causes a first set of computing devices to process the subsequent transaction utilizing the debit processing pipeline or a second set of computing devices to process the subsequent transaction utilizing the credit processing pipeline in accordance with the token remapping operation performed asynchronously from processing the subsequent transaction.

2. The method of claim 1, wherein determining the predicted transaction characteristics comprises generating, utilizing the prediction model, the predicted payment amount associated with the future transaction involving the single physical or digital card of the payment account according to a plurality of transaction amounts associated with the plurality of previous transactions.

3. The method of claim 1, wherein determining the predicted transaction characteristics comprises generating, utilizing a machine-learning model comprising parameters trained utilizing the information associated with the payment account, the predicted transaction characteristics for the future transaction according to one or more trends in the information associated with the payment account.

4. The method of claim 1, wherein determining the predicted transaction characteristics comprises:

validating the prediction model provided by a third-party system corresponding to the payment account via one or more quality checks; and determining the predicted transaction characteristics utilizing the prediction model based on validating the prediction model.

5. The method of claim 1, wherein generating the request to the payment network to create the token mapping comprises:

determining that the predicted transaction characteristics correspond to the credit sub-account tied to the payment account; and generating, via the application programming interface call to the payment network, the request to create the token mapping in connection with the credit sub-account of the payment account.

6. The method of claim 5, wherein determining that the predicted transaction characteristics correspond to the credit sub-account comprises determining that the predicted payment amount of the future transaction is less than an available balance of the credit sub-account.

7. The method of claim 6, wherein processing the subsequent transaction comprises sending the token corresponding to the payment account to the payment network to route via the credit processing pipeline corresponding to the credit sub-account.

8. The method of claim 1, wherein determining the information associated with the payment account further comprises determining a credit score associated with the payment account, recipient information of the plurality of previous transactions, geographical locations associated with the plurality of previous transactions, payment amounts associated with the plurality of previous transactions, or available balances of the plurality of separate sub-accounts.

9. The method of claim 1, further comprising:

detecting the token remapping event by detecting an indication of a completed payment transaction for the payment account, a request to remap a token for the payment account, or an indication of changes to account details associated with the payment account; and generating the request to the payment network to create the token mapping in response to the token remapping event.

10. A system comprising:

one or more non-transitory computer readable media; and at least one processor configured to cause the system to:

access information associated with a payment account comprising characteristics of a plurality of previous transactions associated with the payment account in response to a token remapping event for the payment account, the payment account corresponding to a plurality of separate sub-accounts including a debit sub-account and a credit sub-account, wherein a single physical or digital card is tied to the payment account corresponding to the plurality of separate sub-accounts;

determine, utilizing a prediction model that is trained on payment account information and account details to predict transaction characteristics for future transactions, predicted transaction characteristics for a future transaction involving the single physical or digital card based on the information associated with the payment account, the predicted transaction characteristics comprising a predicted payment amount, a predicted transaction type, a predicted transaction location, a predicted transaction recipient, or a combination thereof;

generate additional predicted transaction characteristics utilizing a validation model different than the prediction model;

verify the predicted transaction characteristics generated by the prediction model by comparing the predicted transaction characteristics with the additional predicted transaction characteristics;

determine whether a discrepancy between the predicted transaction characteristics and the additional predicted transaction characteristics from the validation model satisfies a threshold associated with halting a token remapping operation associated with the future transaction;

generate, based on verifying the predicted transaction characteristics utilizing the validation model, a request comprising an application programming interface call to a payment network to cause the payment network to perform the token remapping operation asynchronously from processing a subsequent transaction to create a token mapping between a payment account number of the payment account and a token of a selected sub-account of the payment account according to the predicted transaction characteristics for the future transaction and a set of rules by changing a stored value representing the payment account to a processing pipeline for the selected sub-account; and processing the subsequent transaction initiated using the single physical or digital card of the payment account routed to a debit processing pipeline or a credit processing pipeline via the payment network based on the token mapping between the payment account and the selected sub-account, wherein the token remapping operation causes a first set of computing devices to process the subsequent transaction utilizing the debit processing pipeline or a second set of computing devices to process the subsequent transaction utilizing the credit processing pipeline in accordance with the token remapping operation performed asynchronously from processing the subsequent transaction.

11. The system of claim 10, wherein the at least one processor is further configured to cause the system to determine the predicted transaction characteristics by:

determining an average transaction amount of the plurality of previous transactions associated with the payment account; and determining the predicted transaction characteristics based on the average transaction amount.

12. The system of claim 10, wherein the at least one processor is further configured to cause the system to determine the predicted transaction characteristics by:

providing the information associated with the payment account to a third-party system corresponding to the payment account; and receiving the predicted transaction characteristics for the future transaction from the third-party system.

13. The system of claim 12, wherein the at least one processor is further configured to cause the system to determine the predicted transaction characteristics by:

receiving the validation model from the third-party system in connection with the prediction model that the third-party system utilizes to generate predicted transaction characteristics for future transactions.

14. The system of claim 10, wherein the at least one processor is further configured to cause the system to generate the request to the payment network to create the token mapping by:

determining that the predicted transaction characteristics correspond to a sub-account of the plurality of separate sub-accounts of the payment account according to account details of the sub-account of the plurality of separate sub-accounts;

selecting the sub-account of the plurality of separate sub-accounts of the payment account in response to determining that the predicted transaction characteristics correspond to the sub-account of the plurality of separate sub-accounts; and generating, via the application programming interface call to the payment network, the request to create the token mapping for the future transaction involving the single physical or digital card in connection with the selected sub-account of the plurality of separate sub-accounts.

15. The system of claim 14, wherein the at least one processor is further configured to cause the system to determine that the predicted transaction characteristics correspond to the sub-account of the plurality of separate sub-accounts by:

determining one or more characteristics of the sub-account of the plurality of separate sub-accounts based on the information associated with the payment account; and comparing the predicted transaction characteristics to the one or more characteristics of the sub-account.

16. The system of claim 10, wherein the at least one processor is further configured to cause the system to process the subsequent transaction involving the single physical or digital card by sending a token corresponding to the payment account to the payment network to route via the processing pipeline corresponding to the selected sub-account.

17. The system of claim 10, wherein the at least one processor is further configured to cause the system to:

detect the token remapping event comprising a change to one or more account details associated with the payment account; and generate the request to the payment network to create the token mapping in response to the change to the one or more account details associated with the payment account.

18. A non-transitory computer readable medium comprising instructions that, when executed by at least one processor, cause the at least one processor to:

access information associated with a payment account comprising characteristics of a plurality of previous transactions associated with the payment account in response to a token remapping event for the payment account, the payment account corresponding to a plurality of separate sub-accounts including a debit sub-account and a credit sub-account, wherein a single physical or digital card of the payment account is tied to the payment account corresponding to the plurality of separate sub-accounts;

determine, utilizing a machine-learning model that is trained on payment account information and account details to predict transaction characteristics for future transactions, predicted transaction characteristics for a future transaction involving the single physical or digital card based on the information associated with the payment account, the predicted transaction characteristics comprising a predicted payment amount, a predicted transaction type, a predicted transaction location, a predicted transaction recipient, or a combination thereof;

generate additional predicted transaction characteristics utilizing a validation model different than the machine-learning model;

verify the predicted transaction characteristics generated by the machine-learning model by comparing the predicted transaction characteristics with the additional predicted transaction characteristics;

determine whether a discrepancy between the predicted transaction characteristics and the additional predicted transaction characteristics from the validation model satisfies a threshold associated with halting a token remapping operation associated with the future transaction;

generate, based on verifying the predicted transaction characteristics utilizing the validation model, a request comprising an application programming interface call to a payment network to cause the payment network to perform the token remapping operation asynchronously from processing a subsequent transaction to create a token mapping between a payment account number of the payment account and a token of a selected sub-account of the payment account according to the predicted transaction characteristics for the future transaction and a set of rules by changing a stored value representing the payment account to a processing pipeline for the selected sub-account; and processing the subsequent transaction initiated using the single physical or digital card of the payment account routed to a debit processing pipeline or a credit processing pipeline via the payment network based on the token mapping between the payment account and the selected sub-account, wherein the token remapping operation causes a first set of computing devices to process the subsequent transaction utilizing the debit processing pipeline or a second set of computing devices to process the subsequent transaction utilizing the credit processing pipeline in accordance with the token remapping operation performed asynchronously from processing the subsequent transaction.

19. The non-transitory computer readable medium of claim 18, further comprising instructions that, when executed by the at least one processor, cause the at least one processor to determine the predicted transaction characteristics by determining, utilizing the machine-learning model, the predicted payment amount for the future transaction according to a plurality of transaction amounts of the plurality of previous transactions.

20. The non-transitory computer readable medium of claim 18, further comprising instructions that, when executed by the at least one processor, cause the at least one processor to generate the request to the payment network to create the token mapping by:

determining, according to the set of rules, that the predicted transaction characteristics correspond to the selected sub-account of the payment account by comparing the predicted transaction characteristics to the account details of the payment account; and generating, via the application programming interface call to the payment network, the request to create the token mapping in connection with the selected sub-account of the payment account.

* * * * *